(12) United States Patent
Stierle et al.

(10) Patent No.: US 6,801,305 B2
(45) Date of Patent: Oct. 5, 2004

(54) DEVICE FOR OPTICALLY MEASURING DISTANCES

(75) Inventors: Joerg Stierle, Waldenbuch (DE); Peter Wolf, Leinfelden-Echterdingen (DE)

(73) Assignee: Robert Bosch GmbH, STuttgart (DE)

( * ) Notice: Subject to any disclaimer, the term of this patent is extended or adjusted under 35 U.S.C. 154(b) by 0 days.

(21) Appl. No.: 10/333,496

(22) PCT Filed: Apr. 18, 2002

(86) PCT No.: PCT/DE02/01432

§ 371 (c)(1),
(2), (4) Date: Jun. 16, 2003

(87) PCT Pub. No.: WO02/095446

PCT Pub. Date: Nov. 28, 2002

(65) Prior Publication Data

US 2004/0012770 A1 Jan. 22, 2004

(30) Foreign Application Priority Data

May 18, 2001 (DE) ........................ 101 24 433

(51) Int. Cl.[7] ................................ G01C 3/08
(52) U.S. Cl. .................. 356/4.01; 356/5.01; 356/5.1
(58) Field of Search .............................. 356/3.01–5.15; 219/121.78

(56) References Cited

U.S. PATENT DOCUMENTS

| | | | | |
|---|---|---|---|---|
| 3,634,011 A | * | 1/1972 | Scholdstrom | 356/5.01 |
| 4,384,199 A | * | 5/1983 | Ogino et al. | 250/204 |
| 4,686,360 A | * | 8/1987 | Gorgon | 250/201.2 |
| 4,843,228 A | * | 6/1989 | Nakamura | 250/201.4 |
| 5,737,085 A | | 4/1998 | Hallidy et al. | |
| 5,923,468 A | * | 7/1999 | Tsuda et al. | 359/426 |
| 5,933,225 A | * | 8/1999 | Yamabuchi | 356/5.01 |
| 5,949,531 A | * | 9/1999 | Ehbets et al. | 356/5.01 |
| 6,469,787 B1 | * | 10/2002 | Meyer et al. | 356/342 |

FOREIGN PATENT DOCUMENTS

| | | |
|---|---|---|
| DE | 35 45 827 A | 8/1986 |
| DE | 36 01 386 C | 5/1987 |
| DE | 42 39 061 A | 5/1994 |
| DE | 198 40 049 A | 4/2000 |

* cited by examiner

Primary Examiner—Bernarr E. Gregory
Assistant Examiner—Brian Andrea
(74) Attorney, Agent, or Firm—Michael J. Striker

(57) ABSTRACT

The invention relates to an apparatus for optical distance measurement, having a transmitter unit (12) for emitting optical radiation (13), in particular laser radiation, in the direction of a target object (15); having a receiver unit (14) for receiving the radiation (16, 49) reflected by the target object (15); and having a control and evaluation unit (56) for ascertaining the distance between the apparatus and the target object (15), and also having at least one optical means (26, 28, 30, 50) for beam guidance.

It is proposed that the relative position of the at least one optical means (26, 28, 30, 50) and the light source (17, 18) of the apparatus to one another be variable.

9 Claims, 3 Drawing Sheets

DEVICE FOR OPTICALLY MEASURING DISTANCES

BACKGROUND OF THE INVENTION

The invention relates generally for optical distance measurement.

PRIOR ART

Optical distance measuring devices per se have been known for a long time. These devices emit a modulated light beam, which is aimed at a desired target surface, whose distance from the device is to be ascertained. The light reflected from or scattered by the target face aimed at is in part detected again by the device and used to ascertain the distance sought. A distinction is made between so-called phase measuring methods and pure transit time methods for determining the distance sought. In the transit time measuring method, for instance, a light pulse of the shortest possible duration is emitted by the device, and its transit time to the target and back again into the measuring device is ascertained. From this, because the value of the speed of light is known, the distance from the device to the target can be calculated.

In the phase measuring methods, the variation in phase with the travel distance is utilized to determine the distance. Via the phase displacement of the returning light, compared to the light emitted, the route traveled by the light and thus the spacing from the target object can be determined.

The range of application of such distance measuring devices includes differences in the range from a few millimeters up to several hundred millimeters.

Depending on the travel distances to be measured and the capability of the target object to return a beam, different demands are made of the light source, the quality of the measurement beam, and the detector.

At relatively short distances—in the range up to several meters—from a target that furthermore has good retro-reflectivity, a well-collimated light beam of limited diffraction will advantageously be used, in order to obtain good resolution and a correspondingly strong returning signal.

At great distances, the problem is meeting the desired target with a fine light beam, such as a focused, limited-diffraction laser beam, so that for this type of application, it is advantageous to use a measuring beam with a larger diameter.

The optical distance measuring devices known from the prior art can fundamentally be divided into two categories, depending on the disposition of transmission conduits and reception conduits. First, there are apparatuses in which the transmission conduit is disposed next to the reception conduit at a certain distance from it, so that the respective optical axes extend parallel to one another. Second, monoaxial measuring devices exist in which the reception conduit extends coaxially with the transmission conduit.

From German Patent DE 198 40 049 C2, a monoaxial device for optical distance measurement is known for geodetic, construction and industrial uses, with which both highly retro-reflective and poorly retro-reflective target objects can be measured. This apparatus furthermore has high resolution, even for poorly retro-reflective objects.

The apparatus of DE 198 40 049 C2 has a transmitter unit, with one or two optical radiation sources for generating two separable beams. One beam is limited in its diffraction and includes light in the visible wavelength range, while conversely the other beam is divergent and is in the visible or infrared wavelength range.

A disadvantage of the apparatus of DE 198 40 049 C2 is the complex generation of the various measuring beams. Depending on the type of embodiment, the device uses two separate laser diodes, or dual-wavelength lasers, to generate the two measuring beams. The different beam divergences are generated by complicated telescope lens elements in the two beam paths of this apparatus. The apparatus of DE 198 40 049 C2 furthermore requires selection means for detecting the different, coaxially extending types of radiation and beams. The selection means mentioned in DE 198 40 049 C2, such as optical filters, controllable frequency doublers, and Q switchers are complicated and expensive optical components that make the measuring system quite complex, inconvenient to handle, and expensive.

Biaxial measuring systems, by comparison, have the advantage of not requiring complicated beam splitting, so that optical crosstalk from the transmission conduit directly into the reception conduit can be better suppressed.

On the other hand, in biaxial distance measuring devices there is the disadvantage that for the range of short measurement distances, parallax can cause detection problems. The projection of the target object onto the detector surface, which for great target distances is still located unequivocally on the detector, increasingly migrates away from the optical axis of the receiving branch as the measurement distance becomes shorter, leading to a variation in the beam cross section in the plane of the detector.

SUMMARY OF THE INVENTION

The apparatus of the invention for optical distance measurement, has the advantage over the prior art that the beam generated in the distance meter can be adapted to the various measurement tasks (that is, different target objects or target distances that have to be measured) with merely a single optical means. In particular, the divergence and the direction of the measuring beam can be adapted to the particular measurement requirement with this single optical means.

Two separate, different beam paths for furnishing beams of different divergence are unnecessary in the apparatus of the invention. This advantageously makes a compact, hand-held measuring device possible, for instance.

The different beam divergences of the measuring beam can be achieved by simply varying the relative disposition of the light source and an optical means.

In a first advantageous embodiment of the distance measuring device of the invention, the optical means used is a lens or lens combination that serves as a lens element and is placed for instance in the beam path of the transmitter unit of the measuring device. Other optical means can also be imagined and will be described later.

Advantageously, the apparatus of the invention for optical distance measurement can be realized by using a laser as the light source. Various kinds of miniaturized lasers that can be built into such measuring devices are presently available. Because of their small size and high power, semiconductor lasers are especially advantageous for the purpose; by now, they are available with suitable quality even for the visible part of the spectrum of electromagnetic waves.

To generate a collimated, limited-diffraction measuring beam, the light source is placed in the focus of the lens element on the object. The divergent beam emerging from the light source is collimated after passing through the lens element and forms a largely parallel measuring beam, which can for instance be used for the distance measurement with high resolution.

If a measuring beam of increased divergence is required, as a result of the need to measure relatively great measuring distances, then in the apparatus of the invention, the lens element lens can be moved in the direction of the optical axis of the measurement signal, in order to vary and adjust the desired divergence of the measuring beam.

Thus in the apparatus of the invention, it is possible for instance first to use a divergent beam, for aiming the device at a target object located far away, and after the measuring beam strikes the target object, the measuring beam can be recollimated with limited diffraction, in order to achieve good resolution and a clearly measurable returning signal in the measuring device.

To vary the beam divergence, the lens element lens is adjusted in its position by way of various actuators that are controlled by a closed-loop control mechanism.

In another embodiment of the apparatus of the invention, the position of the light source can be varied via corresponding actuators and an associated closed-loop control circuit relative to what is then optionally a fixed collimating lens element.

The control of the actuators that are capable of varying the relative disposition of the lens element and the light source is done manually in one embodiment of the device, in such a way that the user first widens the measuring beam, by pressing on a button on the control element of the device, for instance, and aims it at the target object, until the device shows him a returning signal. Next, the user can adjust the desired degree of collimation of the measuring radiation, in order to obtain increased resolution, for instance, or a suitably strengthened received signal. Point-precise measurement is thus possible, by reducing the size of the measurement spot, without the disadvantages that a small measurement spot represents for aiming at a target object that is for instance located far away.

In a further advantageous embodiment of the measuring device of the invention, the triggering of the actuators for the optical means, which means can for instance be a lens element, is taken on by a self-controlling closed-loop control circuit. Sensors at or in the measuring beam detect the beam diameter or the divergence of the beam and send this information on to an automatic closed-loop control mechanism. This closed-loop control mechanism then controls the actuators as desired, which assure a displacement of the lens element and/or of the light source as well. If the desired or required beam divergence is detected by the sensors, then the further displacement of the optical element is stopped.

Besides the divergence of the measuring beam, with the apparatus of the invention the position of the light beam can also be varied. By displacing the lens element perpendicular to the optical axis, the measuring beam can be deflected, for instance so that a certain angular range can be swept by a collimated beam of light.

In an advantageous embodiment of the apparatus of the invention, a "scanning mode" is therefore provided, which makes it possible, by suitably fast displacement of the lens element lens, for the measuring beam to be deflected horizontally and/or vertically over an angular range. This embodiment of the apparatus of the invention advantageously makes it possible to locate target objects that are small or far away. By means of an automated closed-loop control circuit, of the kind for instance described above, it can be attained that the scanning mode is stopped once the receiver unit of the measuring device detects a returning signal. The closed-loop control mechanism can then set up the lens element in such a way that a maximum returning signal, for instance, is measured.

In another advantageous feature of the apparatus of the invention, a suitable optical means is located in the receiving branch of the measuring device. Typically, in devices of the prior art, there is a collimating lens in the receiving branch of the distance measuring device. This lens collects the returning light and focuses it onto a detector to enhance the power density. To that end, this collimating lens is located at the distance of its focal length in front of the detector, in order to focus light from a great distance exactly onto the detector.

If as the optical means of the invention a lens element that can be adjusted as described relative to the detector and thus also to the light source is placed in the receiving beam path, then it is possible to correct the focusing of the returning beam. In particular, with this embodiment of the apparatus of the invention, the parallax problem of biaxial measuring devices is overcome.

In biaxial measuring devices, because of a spatial separation, there are two separate, usually parallel optical axes for the transmitted signal and the received beam. Besides the dependency, already described above, of the focusing—and thus also the of size of the focus on the detector—on the distance of the target object from the measuring device, a lateral shift in the returning beam relative to the optical axis of the receiving branch also occurs. This lateral shift can become so great that, for very short distances from the target object, the returning signal no longer strikes the detector, or strikes it only inadequately.

By means of a lateral shift of the optics in the receiving branch, this parallax-caused beam offset can be compensated for, and the measuring device of the invention can for instance be adjusted to a detection maximum for the returning radiation.

The variation in the position of the lens can advantageously be achieved once again via an automatic closed-loop control circuit, which by way of sensors determines the signal intensity of the detector, for instance, and triggers the actuators in such a way that for instance a maximum for the detected signal results.

BRIEF DESCRIPTION OF THE DRAWINGS

In the drawing, one exemplary embodiment of the apparatus of the invention is shown and will be described in further detail in the ensuing description.

Shown are.

DETAILED DESCRIPTION OF THE PREFERRED EMBODIMENTS

Figure 1:
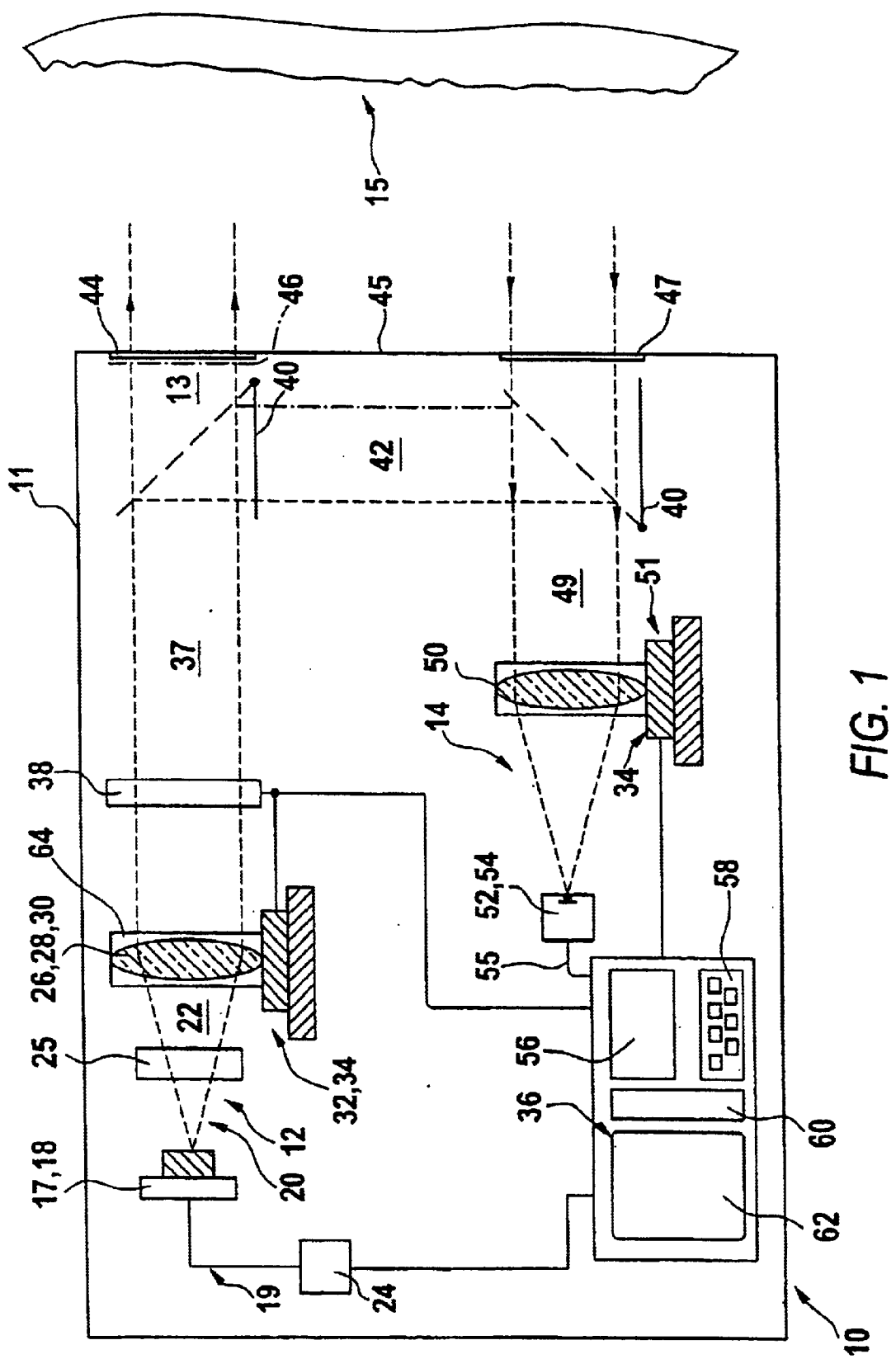
FIG. 1, the schematic plan view on one exemplary embodiment of the apparatus of the invention.

In FIG. 1, a distance measuring device of the invention is shown schematically along with the most important components, for describing its function.

The device 10 of the invention has a housing 11, in which a transmitter device 12 for generating a measurement signal 13 and a receiver device 14 for detecting the measurement signal 16 returning from a target object 15 are accommodated.

The transmitter device 12 includes a light source 17, which in the exemplary embodiment of FIG. 1 is embodied by a semiconductor laser diode 18. It is equally possible to use other light sources in the apparatus of the invention. The laser diode 18 emits a laser beam 20, in the form of a beam of light 22 that is visible to the human eye.

The laser diode 18 is driven via a control unit 24, which by means of suitable electronics generates a modulation of the electrical input signal 19 to the diode 18. By this kind of modulation of the diode current, for instance, it can be attained that the measurement signal 13 is likewise modulated in a desired way for determining the distance.

The laser beam 20 emerging from the diode 18 travels in the exemplary embodiment through a first lens element 25, which improves the generally poor beam profile of the laser diode. This first lens element 25 can for instance comprise a cylindrical lens, or a combination of a plurality of lenses and apertures, and will not be described in further detail here. A lens element of this kind can also be a component of the laser diode.

The laser beam 20 then passes through a collimating lens element 26, in the form of a lens element 28, which is represented in FIG. 1 in the form of a single lens 30. The lens element 28 is located on an adjustment simulator 32, which makes it possible to change the position of the lens element in all three directions in space. To that end, a plurality of actuators 34 are for instance coupled with adjusting elements, which make it possible for the lens element to move not only along the optical axis of the transmitter device but also in the two directions in space orthogonal to it. The actuators 34 are actuated via a closed-loop control mechanism 36, which will be described in detail hereinafter.

After the passage through the lens element 28, the result is for instance an amplitude-modulated measurement signal 13 in the form of a parallel beam of light 37, as schematically shown in FIG. 1. Inside the device 10, the beam of light passes through a sensor 38, which is capable of picking up information, for instance pertaining to the beam diameter, the divergence, and the precise direction of the laser beam. This sensor may also be a combination of various detectors. The sensor 38 is likewise connected to the closed-loop control mechanism 36.

Alternatively, some of the light beam 37 can be decoupled via a beam splitter that is placed in the beam path of the measurement signal 13, and diverted to a corresponding nontransmissive sensor.

It is also conceivable, instead of the sensors 38 in the optical beam path, to use sensors for detecting the position of the adjustment simulator 32, in order to perform a defined change in the beam parameters of the measuring beam. Then, measurement of the current beam parameters would no longer be possible, but these parameters can each be calculated from the initial data of the laser diode and the current position of the collimating lens element 26.

In the transmitting branch of the apparatus of the invention, there is also a preferably switchable beam deflector 40, which makes it possible to deflect the measurement signal 13 directly onto the receiver unit 14 of the device 10, bypassing a target object. In this way, it is possible to generate an internal reference path 42 in the device that makes it possible to calibrate the measuring system.

If a measurement is to be done, then the measuring beam 13 leaves the housing 11 of the apparatus of the invention through an optical window 44 in the end wall 45 of the device 10. The opening of the optical window can be assured by means of a shutter 46.

For the measurement, the measuring device 10 is aimed at a target object 15 whose distance from the measuring device is to be ascertained. The signal 16, reflected or scattered by the desired target object 15, forms a returning measuring beam 49, which to a certain extent returns back again to the measuring device 10. Through an inlet window 47 in a face end 45 of the device 10, the returning measuring radiation 49 is coupled into the measuring device and, in the exemplary embodiment of FIG. 1, aimed at a receiving lens element 50. The receiving lens element 50, which in the exemplary embodiment of FIG. 1 is likewise symbolically represented by a single lens, is also located on an adjustment simulator 51, which is constructed analogously to the adjustment simulator 32 of the lens element 28 in the transmission branch of the device 10. The adjustment simulator 51 is in turn connected to the closed-loop control mechanism 36.

The receiving lens element 50 focuses the returning measurement signal 49 at a receiving detector 52, which in the exemplary embodiment of FIG. 1 is shown in the form of a photodiode 54 and converts the incoming light signal 49 into an electrical signal 55. The receiving detector 52 of the apparatus of the invention can also be designed as a photomultiplier or as a spatial-resolution area detector, such as a CCD camera or correspondingly other detection systems for optical radiation that are familiar to one skilled in the art. The receiving detector 52 is connected to the closed-loop control mechanism 36 via an electrical connection 55.

In the exemplary embodiment of FIG. 1, the closed-loop control mechanism 36 has a control unit 58 for inputting data and measurement tasks, a control and evaluation unit 56, a central computation unit 60 for processing the information produced, and a display device 62. The closed-loop control mechanism can either be operated manually or closed to form a completely automated closed-loop control circuit (39).

Other components present in the measuring instrument that however are unnecessary to comprehension of the apparatus of the invention will not be addressed further in this connection.

Figure 2:
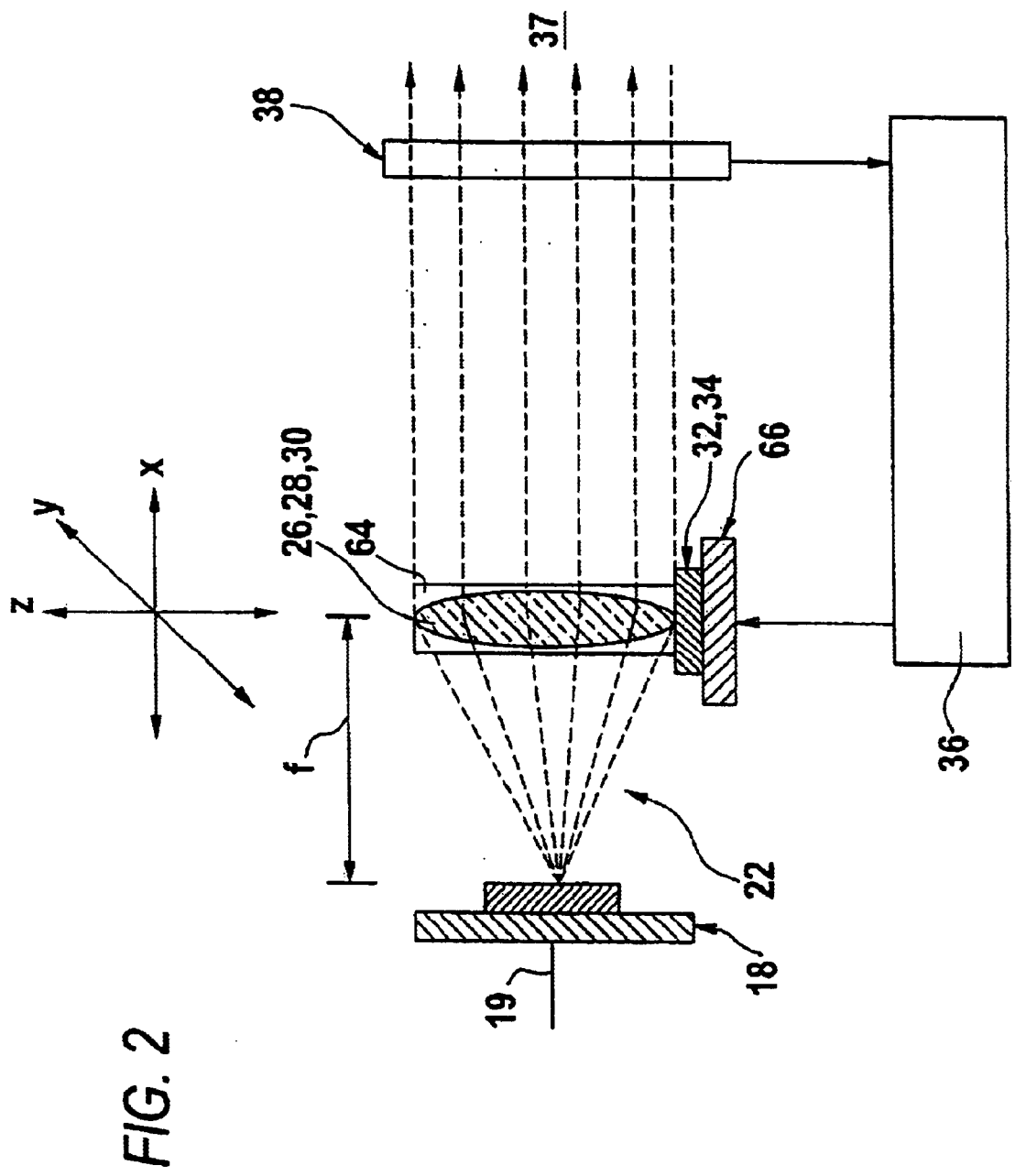
FIG. 2, a detail of the optical beam path of the apparatus of the invention.

In FIG. 2, part of the beam path of the transmitter device 12 of the apparatus of the invention is shown in detail. A corresponding device can also be located in the receiving branch of the measuring device 10.

A laser diode 18, with which a lens element 25 for modification of the beam profile of the emitted laser beam is integrated, is triggered by an electrical signal 19 and emits a divergent beam 22. The beam 22 then passes through a collimating lens element 26 in the form of a lens element 28, which in the normal position is disposed at the distance of its focal length f from the light source 18. The lens element 28 is seated in an adjustment simulator 32, which makes it possible to vary the distance between the light source 18 and the lens element 2B of the measuring device 10 via actuators in a defined way (X direction). The adjustment simulator 32 also makes it possible to displace the lens element in the two directions Y and Z that are orthogonal to the optical axis of the transmitter unit 12. To that end, the lens element 28 is seated in a mount 64 that can be moved relative to a fastening element 66. Via the fastening element 66, the adjustment simulator 32 is fixed in the measuring device 10.

The adjustment simulator 32 for example comprises three translation tables orthogonal to one another, which can each be moved by a stepping motor control, and thus enables a displacement of the lens element lens 28 in these three directions. The stepping motors for controlling the translation are triggered via the control and evaluation unit 56 of the closed-loop control mechanism 36. However, piezoelectric drives are also possible for controlling the translational motion. Thus in a simple way, for instance by varying the distance of the collimating lens element 26 from the light source 18, a divergent or convergent or parallel beam adapted to the measurement task can be generated.

The currently present divergence of the measuring beam is detected via a sensor 38, which in the exemplary embodiment of FIG. 2 is operated by transmission and which sends this information on to the control and evaluation unit 56 of the closed-loop control mechanism and ascertains the extent to which the existing divergence should be changed. The control and evaluation unit 56 sends this information on to the actuators 34, which assure either a further displacement of the lens element 28 or an end to the displacement. In this case, the adjustment of the collimating lens element 36 performed automatically by the closed control circuit 39.

By the corresponding displacement of the collimating lens element 26 in a plane (Y-Z plane) perpendicular to the original optical axis, the measuring beam 37 can be deflected. The degree of this deflection is in turn detected by the sensor 38 and sent on to the control and evaluation unit 56, which sends that information on to the actuators 34. In particular, with this closed-loop control circuit, a "scanning mode" of the measuring device 10 of the invention is possible, which by means of a fast oscillatory motion of the actuators deflects the measuring beam 13 over a certain angular range. If a returning signal is detected at the detector 52 of the measuring device 10, then the amplitude of the scanning angle can be successively reduced, or the scanning mode of the device can be switched off entirely. Once again, this can be performed in automated form by means of the closed-loop control circuit 39 of the measuring device.

Figure 3:
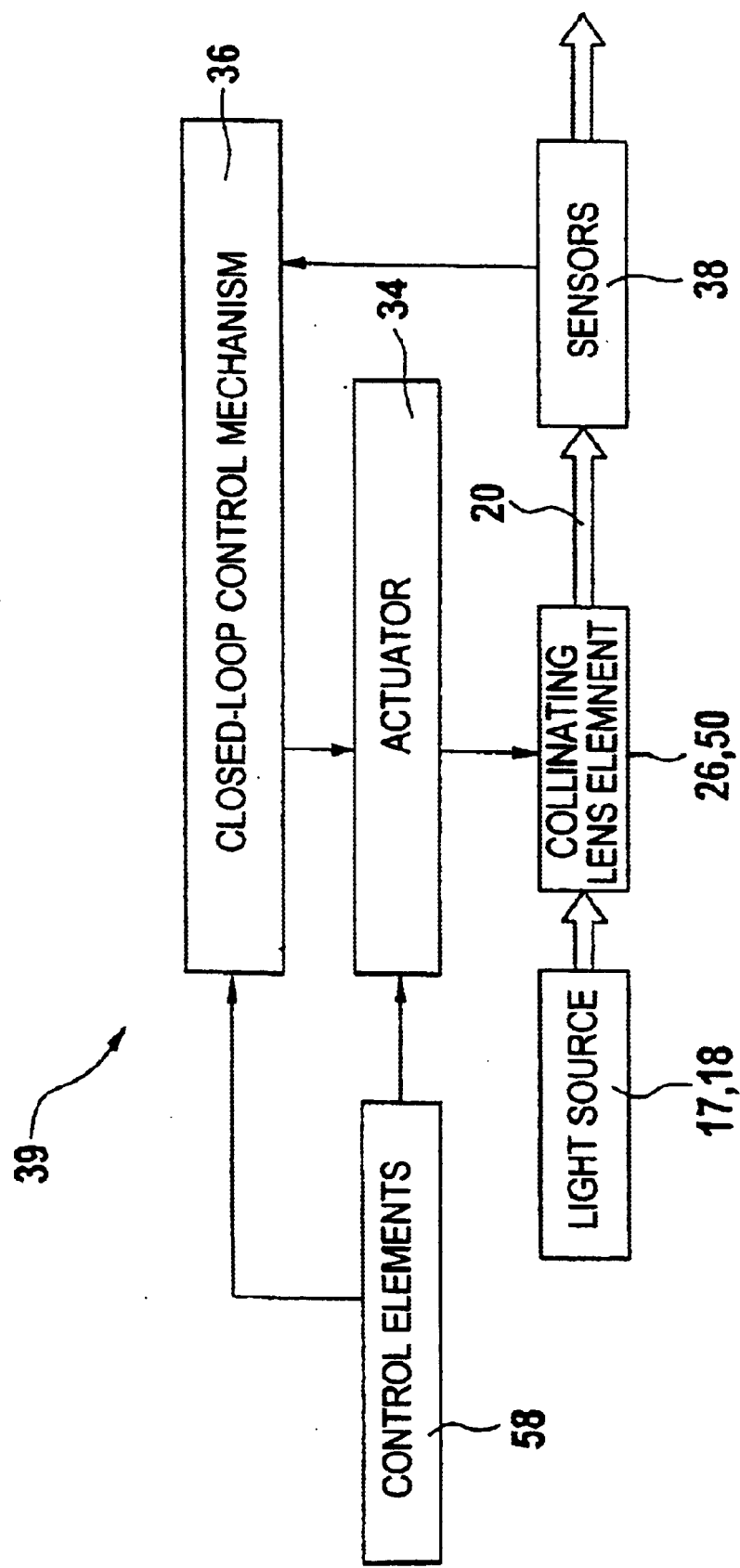
FIG. 3, a schematic illustration of one possible closed-loop control circuit of the apparatus of the invention.

In FIG. 3, a closed-loop control circuit 39 for the measuring device 10 of the invention is shown schematically.

Beginning at the light source 18, a measuring beam 22 is passed through a collimating lens element 26. The essential physical parameters of this measuring beam, such as the beam divergence, beam diameter, or beam direction, are detected by sensors 38 and sent on to a closed-loop control mechanism 36. A control and evaluation unit 56 inside the automatic closed-loop control circuit 39 compares the currently present beam parameters with the desired parameters and sends commands accordingly to the actuators 34 of an adjustment simulator 32 that perform the displacement of the lens element 26 in accordance with the specifications of the control and evaluation unit 56.

If this kind of lens element is placed in the receiving branch of the measuring device 10, then with it, optimizing of the detected measurement signal 49 can for instance be attained in that the automatic closed-loop control circuit 39 adapts the position of the lens element 50 until such time as an optimal signal is present at the receiver 52 of the measuring device 10. To that end, for instance the level of the received signal 49 at the photodiode 54 is sent on to the closed-loop control circuit 39 (see FIG. 1), and the collimating lens element 50 is regulated in such a way that the returning measurement signal 49 at the detector 52 is maximized. The parallax problem of biaxial measuring devices can thus be eliminated by means of a lateral displacement of the collimating lens element 50 on the receiver side.

Analogously to the automatic adjustment described by means of a closed control circuit 39, a manual adjustment of the actuators 34 of the adjustment simulators 32 or 51 can also be made possible in a simple and advantageous way. To that end, the automatic closed-loop control circuit 39 is interrupted, and the actuators 32 of the adjustment simulator are activated by the user by means of the closed-loop control mechanism 36, via suitable control elements 58 of the measuring device 10.

In this way, it is for instance possible in a simple way, by varying the beam divergence, to reliably measure a target object located far away, first by using a greatly widened beam of light in order to strike the target object and then, as soon as a measurement signal is present at the detector of the measuring instrument, changing over to a diffraction-limited beam, which assures good resolution and a strong received signal.

The apparatus of the invention is not limited to the exemplary embodiment presented in this description.

Thus analogously, the position of the light source 17 can also be varied as an alternative, if the collimating lens element 26 cannot or should not be moved.

It is also possible, in addition to the collimating lens element 26 or 50 in the measuring device 10 of the invention, to use an optical fiber as the optical means for beam guidance. The position of this optical fiber can then be varied relative to the collimating lens element 28 or 50 and/or to the light source 17, so that neither the light source 17 nor the collimating lens element itself need to be moved.

What is claimed is:

1. An apparatus for optical distance measurement, comprising:

a transmitter unit (12) with a light source (17, 18) for emitting optical radiation (13, 20, 22) to a target object (15);

a receiver unit (14) for receiving the optical radiation (16, 49) returning from the target object (15);

a control and evaluation unit (56) for ascertaining the optical distance from the apparatus to the target object (15); and at least one optical means (26, 28, 30, 50) for beam guidance of the measuring radiation (13, 49), wherein the relative disposition of the at least one optical means (26, 28, 30, 50) for beam guidance and of the light source (17, 18) relative to one another is variable, and wherein the relative disposition of the at least one optical means (26, 28, 30, 50) and the light source (17, 18) is adjustable in all three directions in space.

2. An apparatus for optical distance measurement, comprising:

a transmitter unit (12) with a light source (17, 18) for emitting optical radiation (13, 20, 22) to a target object (15);

a receiver unit (14) for receiving the optical radiation (16, 49) returning from the target object (15);

a control and evaluation unit (56) for ascertaining the optical distance from the apparatus to the target object (15); and at least one optical means (26, 28, 30, 50) for beam guidance of the measuring radiation (13, 49), wherein the relative disposition of the at least one optical means (26, 28, 30, 50) for beam guidance and of the light source (17, 18) relative to one another is variable;

a closed-loop control mechanism (36), which controls the relative disposition of the at least one optical means (26, 28, 30, 50) and the light source (17, 18); and at least one sensor (38) for detecting at least the beam divergence, and/or the beam direction, and/or the beam diameter of the measurement signals (13), and/or of the returning measurement signal (16), and sends it on to the closed-loop control mechanism (36).

3. The apparatus of claim 1 or 2, wherein the at least one optical means (26, 28, 30, 50) has a lens element (28).

4. The apparatus of claim 3, wherein the lens element (28) is disposed in the beam path of the transmitter device (12) and/or in the beam path of the receiver device (14).

5. The apparatus of claim 1 or 2, wherein the divergence, and/or the direction of the optical radiation (13, 20, 22) emitted toward a target object (15), and/or the optical radiation (16, 49) returning from the target object, is variable by changing the relative disposition of the at least one optical means (26, 28, 30, 50) for beam guidance and of the light source (17, 18) to one another.

6. The apparatus of claim 1 or 2, wherein the position of the lens element (28) relative to the position of the light source (17, 18) is adjustable via actuators (34).

7. The apparatus of claim 2, wherein the closed-loop control mechanism (36) is manually controllable.

8. The apparatus of claim 2, wherein the closed-loop control mechanism (36) is a component of an automatic closed-loop control circuit (39).

9. The apparatus of claim 1, wherein the light source (17, 18) is a laser, in particular a laser diode (18), which emits radiation in the visible wavelength range, for the human eye, of the spectrum of electromagnetic waves.

* * * * *